(No Model.)

C. J. NILLER.
WIRE GAGE.

No. 476,057. Patented May 31, 1892.

WITNESSES:
Henry B. Ross
Geo. W. Norris.

INVENTOR
Charles J. Niller

UNITED STATES PATENT OFFICE.

CHARLES J. NILLER, OF PHILADELPHIA, PENNSYLVANIA, ASSIGNOR TO THE NOVELTY ELECTRIC COMPANY, OF SAME PLACE.

WIRE-GAGE.

SPECIFICATION forming part of Letters Patent No. 476,057, dated May 31, 1892.

Application filed December 29, 1891. Serial No. 416,424. (No model.)

*To all whom it may concern:*

Be it known that I, CHARLES J. NILLER, a citizen of the United States, residing at the city and county of Philadelphia, State of Pennsylvania, have invented a new and useful Wire-Gage, of which the following is a specification.

My invention relates to improvements in wire-gages, wherein a cam-shaped disk or plate is used in conjunction with a movable arm in measuring the diameter of wire.

The objects of my improvement are, first, to provide a small compact gage that may be conveniently carried in the pocket, and, second, to provide means for facilitating calculations relating to the current capacity of wires used in electric lighting, heating, or power supply. I attain these objects by the mechanism illustrated in the accompanying drawings, in which—

Figure 1:
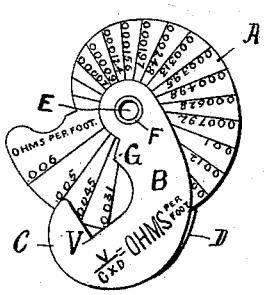
Figure 2:
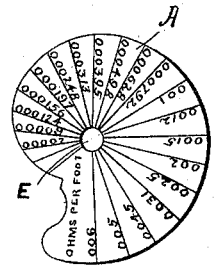
Figure 3:
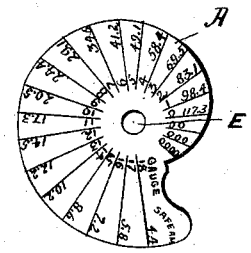

Figure 1 is a view of one side of the device. Fig. 2 is a view of one side of a cam-shaped gage-plate bearing a scale of ohms resistance per foot of wire of given diameter. Fig. 3 is a view of the reverse side of the said gage-plate bearing a scale indicating any standard gage of wire, and also a scale indicating the safe current of electricity that wire of given diameters will carry in ampères of measurement.

Similar letters refer to similar parts throughout the several views.

A is a cam-shaped metal gage-plate.

B is a movable arm pivoted upon the plate at E.

F is a hollow shaft riveting the plate A and the arm B together. The longer portion D of the arm B is slit, so that the plate A moves freely within the two parts. Both the face of the arm B (shown in the drawings) and the reverse face are of equal proportions.

G is a short shoulder serving as a pointer, the reverse face of the arm likewise having a similar shoulder or pointer.

From the central point E of the plate A radial lines are drawn upon both faces to established points upon the periphery of the plate, the proper location of these points, respectively, in relation to the V-shaped opening V as the arm is moved about the plate being ascertained either by calculation or experiment, these radial lines constituting scales of measurement.

Upon one face the radii are marked with, for instance, the American Brown & Sharpe gage for wire, and the safe current of electricity-wire of the respective sizes will carry in ampères. Upon the reverse face the radii are marked with ohms resistance per foot of copper wire of any size within the measuring capacity of the gage. The plate A likewise rotates within the angularly-bent part C of the arm B, which is divided so as to receive it.

I will now describe the method of my device. The wire to be measured is placed within the V-shaped opening V between the movable arm and the edge of the gage-plate. The arm is then moved around the plate until the wire is tightly bound between the edge of the gage-plate A and the two sides of the V-shaped opening V. The pointer G will then indicate the radius bearing the desired measurement. Upon one side of the gage the figures appearing above the pointer G, near the center, will indicate the gage of the wire. The figures nearest the outer edge of the gage on the same radial line will show the number of ampères the wire will safely carry before heating to, say, 30° above any given degree of atmospheric temperature—for instance, that adopted by the board of underwriters. Upon the reverse side of the gage the pointer G will indicate the radius, showing the number of ohms resistance of a foot of copper wire of the same size. To ascertain the resistance of a foot of iron wire of a given size, multiply the indicated resistance of a foot of copper wire of that size by, say, seven. To find the resistance of a foot of German-silver wire of a given size, multiply the indicated resistance of a foot of copper wire of that size by, say, thirteen. The respective products will be the respective resistances. Instead of a scale representing ohms resistance a scale of circular mills can be used in connection with a suitable formula; but the mode herein described I consider simpler and to be preferred.

The number of lamps that can be supplied by a wire of given size can also be ascertained thus: By means of the gage get the size of the wire and its safe carrying capacity in ampères. The wire will carry as many lamps as the current required for one lamp of a given voltage is contained in the ampère capacity of the wire, as shown by the gage. A fifty-volt lamp requires one ampère, a seventy-five-volt lamp requires three-fourths of an ampère, and a one-hundred-and-ten-volt lamp one-half of an ampère of current. For example, the safe ampère capacity of No. 12 copper wire, Brown & Sharpe gage, is shown to be fourteen and one-half ampères, and one one-hundred-and-ten-volt lamp requires one-half ampère of current. Therefore $\frac{14\frac{1}{2}}{\frac{1}{2}}=29$, the number of lamps a No. 12 Brown & Sharpe gage copper wire will carry.

To find the size of wire required to supply a given number of lamps at a given distance at a given loss, proceed as follows: Taking the formula as stamped upon the gage-arm B, let V equal the volts loss, let C equal the total ampères, let D equal the distance in feet, (both ways.) Desiring the size of a feeder-wire that will carry twenty ampères at a loss of ten volts four hundred feet, (eight hundred feet both ways,) V equals loss in volts, which in this case is ten; C equals total ampères, which in this case is twenty; D equals total distance, which in this case is eight hundred. Therefore $\frac{10}{20\times 800}=\frac{10}{16000}=.000625$, the resistance of one foot of copper wire. Rotate the arm until the pointer G is in line with the radius bearing that number of resistance nearest to the above result and the pointer upon the opposite side of the gage will indicate the Brown & Sharpe copper-wire gage desired. In the above instance it will be found to be No. 8.

The desired scales may be put all upon one face and a single arm used with one or two pointers; but I prefer dividing the scales, placing some upon each side of the plate and using the double arm, as shown in the drawings.

What I claim as my invention, and desire to secure by Letters Patent, is—

In an electric-wire gage, the combination of a cam-shaped plate bearing a scale of ohms per foot, a wire-gage scale, a safe-current scale, with a pivoted arm B, having a pointer or pointers G, an angular bend V, and a formula $\frac{V}{C\times D}=$ohms per foot stamped upon said arm, substantially as described, and for the purposes set forth.

CHARLES J. NILLER.

Witnesses:
 HENRY B. ROBB,
 GEO. W. NORRIS.